United States Patent [19]

Baron

[11] 4,201,979
[45] May 6, 1980

[54] CONVEYING DATA SIGNALS BETWEEN RELATIVELY ROTATABLE UNITS

[75] Inventor: John R. Baron, London, England

[73] Assignee: British Aircraft Corporation Limited, London, England

[21] Appl. No.: 927,181

[22] Filed: Jul. 24, 1978

[30] Foreign Application Priority Data

Jul. 27, 1977 [GB] United Kingdom ............... 31457/77

[51] Int. Cl.² ..................... G08B 29/00; G08C 9/00; G08B 21/00
[52] U.S. Cl. .............................. 340/181; 340/201 R; 340/661
[58] Field of Search ............... 340/177 R, 181, 201 R, 340/188 R, 347 P, 671, 661, 672, 201 P, 347 M, 203; 310/232

[56] References Cited

U.S. PATENT DOCUMENTS

| | | | |
|---|---|---|---|
| 3,614,774 | 10/1971 | Clements | 340/347 P |
| 3,683,368 | 8/1972 | Ebner | 340/347 P |
| 3,961,317 | 6/1976 | Debrem et al. | 340/177 R |

*Primary Examiner*—John W. Caldwell, Sr.
*Assistant Examiner*—James J. Groody
*Attorney, Agent, or Firm*—Sughrue, Rothwell, Mion, Zinn and Macpeak

[57] ABSTRACT

When high-speed digital signals are transmitted through a slip ring connection between relatively rotatable systems, the slip ring connection is prone to brief interruptions of contact which introduce extra "ones" or "zeros" into the transmitted digital wave form. In this invention, the binary input signal is split into two paths, one-representing signals causing a current to pass through a first slip ring and zero-representing signals causing a current to pass through a second slip ring. On the output side of the slip rings, the passage of current through one slip ring or the other is used to reproduce the original binary signal; additionally, the combined current flow through both slip rings is used to generate an extra signal which, in the absence of current in either slip ring, indicates a fault.

7 Claims, 1 Drawing Figure

U.S. Patent   May, 6, 1980   4,201,979
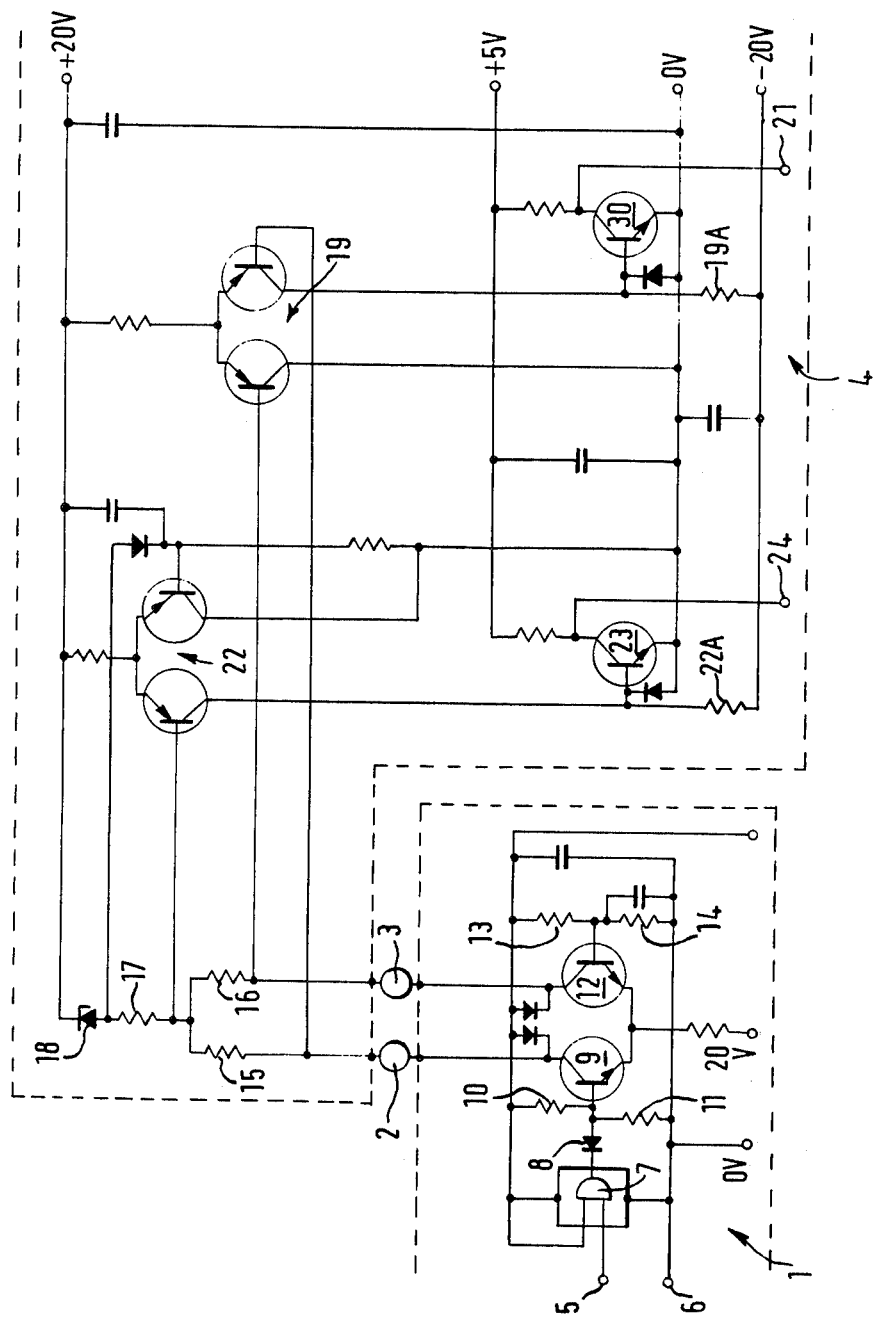

CONVEYING DATA SIGNALS BETWEEN RELATIVELY ROTATABLE UNITS

BACKGROUND OF THE INVENTION

This invention relates to apparatus for carrying a binary digital signal, having first and second logic levels between relatively rotatable first and second units through wiping electrical connecting means, such as a slip ring device for example.

Wiping joints, such as slip rings, are prone to very brief but significant interruptions of contact, and such interruptions would normally modify a digital waveform transmitted through them by introducing extra "ones" or "zeros". The modification would render the data incorrect without any immediate indication that interruption and occurred and that the data was in fact incorrect.

SUMMARY OF THE INVENTION

Apparatus according to the invention comprises: first and second wiping connectors for carrying current between the relatively rotatable first and second units; means responsive to the existence of the first or the second logic level in the binary digital input signal to pass a current through the first or the second wiping connector, respectively, from the first unit to the second unit; output means responsive to current flow to the second unit through the first or the second wiping connector to generate an output signal having a first or a second logic level, respectively; and means responsive to the absence of current in both wiping connectors in the presence of an input signal to provide an indication of a fault.

Thus, the apparatus is capable of indicating the presence of a faulty slip ring, for example.

In the preferred form of apparatus embodying the invention, on the output side of first and second slip rings there are first and second load resistors, the end of the load resistors remote from the slip rings being connected to a common load resistor. The differential signal voltage developed between the first and second load resistors is used to produce the digital output signal voltage of first or second logic level, according to the polarity of the differential signal, and the absence of a current flow through the common load resistor at any time is used to provide the fault indication. In this way, by producing the extra output signal from the common load resistor, the apparatus is able to sense, on the output side of the slip rings, an interruption of the binary signal at a slip ring, whether the interruption occurs at digital "zero" or digital "one", and to provide an immediate indication that an interruption has occurred. The extra signal thus contains information enabling corrective measures to be instantly applied.

BRIEF DESCRIPTION OF THE DRAWINGS

In order that the invention may be better understood, one example of apparatus embodying the invention will now be described with reference to the accompanying drawing, which shows an electrical circuit diagram of an apparatus according to the invention.

DETAILED DESCRIPTION OF THE PREFERRED EMBODIMENT

In the example shown in the drawing, a binary digital signal voltage having first and second logic levels and developed in a rotatable first unit is converted by an input circuit generally indicated at 1 to a current signal on one or other of two lines (according to the logic level) leading to slip rings 2 and 3. The slip rings 2 and 3 pass these currents to an output and fault-indicating circuit, generally indicated at 4, in a stationary unit.

The binary digital input signal is applied to the input circuit 1 by way of terminals 5 and 6, terminal 6 being grounded. Terminal 5 is connected to a logical inverter circuit 7, the output of which is coupled through diode 8 to the base of an NPN transistor 9 biased by potentiometer resistors 10 and 11. The transistor 9 and a further transistor 12 together form a common emitter resistor differential amplifier in which the base of transistor 12 is held at a fixed voltage by a further potentiometer comprising resistors 13 and 14.

The collectors of transistors 9 and 12 are connected through slip rings 2 and 3 respectively to collector load resistors 15 and 16 in the output circuit 4 of the stationary unit. The ends of the resistors 15 and 16 remote from the slip rings are connected through a common load resistor 17 and a Zener diode 18 to a supply voltage. The slip-ring ends of resistors 15 and 16 provide input voltages for a second differential amplifier, generally indicated by reference numeral 19. One transistor element of the differential amplifier 19 has in its output current path a resistor 19A, the voltage across which drives a switching transistor 30 connected to an output terminal 21. Voltages from the two ends of the common load resistor 17 are applied to respective ones of the control electrodes of a further differential amplifier 22. One of the transistor elements of the differential amplifier 22 includes in its output current path a resistor 22A which provides a control signal for the switching transistor 23 connected to a fault-indicating output terminal 24.

The circuit shown operates in the following manner. When the digital input signal at terminal 5 is high (for example, a logic "1" at a 5-volt level) diode 8 is reverse-biased and the base bias voltage of transistor 9 is higher than that of transistor 12; in these circumstances, due to the common-emitter connection of these transistors, only transistor 9 conducts. The current passed by transistor 9 flows through slip ring 2 and load resistors 15 and 17. The presence of a current flow through resistor 15 and no current flow through resistor 16 causes differential amplifier 19 to drive the switching transistor 30 to one of its "on" and "off" states, resulting in a signal of a first logic level at the output terminal 21.

When the input signal is low (for example, a logic "0" at 0-volts), diode 8 is forward-biased, reducing the base-bias voltage of transistor 9 below that of transistor 12, so that only the latter transistor conducts. In this case, current passes through slip ring 3 and load resistors 16 and 17. The presence of current flow through resistor 16 and not through resistor 15 results in the differential amplifier 19 driving the switching transistor 30 to the second of its "on" and "off" states, resulting in a signal of a second logic level at the output terminal 21. In this way, the digital input signal is reproduced at the output terminal 21.

For both the first and the second logic levels of the input signal, current flows through one or other of the slip rings and through the common load resistor 17. However, if a slip ring fails to conduct current when the appropriate transistor 9 or 12 is switched "on" (due to a slip-ring brush failure, for example), a voltage is no longer developed across resistor 17. In this case, the bias normally derived from the resistor 17 for the differential amplifier 22 is removed, the circuit of the differential amplifier 22 being such that with the removal of this normal bias the differential amplifier changes state. As a consequence, the state of switching transistor 23 is reversed and a fault-indicating signal is provided at output terminal 24, connected to the collector of switching transistor 23.

In this way, a fault is indicated when the faulty slip ring should be conducting current. Also, the fault is indicated only when the faulty slip ring should be conducting; if the slip ring 3 is faulty there is no loss of signal for a logic 1 input, since slip ring 2 conducts for that input state, and similarly, when the input is logic 0, slip ring 3 conducts in spite of a fault on slip ring 2.

I claim:

1. Apparatus for carrying a binary digital input signal having first and second logic levels between relatively rotatable first and second units, comprising; first and second wiping connectors for carrying current between the relatively rotatable first and second units; means responsive to the existence of the first or the second logic level in the binary dititial input signal to pass a current through the first or the second wiping connector, respectively, from the first unit to the second unit; output means responsive to current flow to the second unit through the first or the second wiping connector to generate an output signal having a first or a second logic level, respectively, and means responsive to the absence of current in both wiping connectors, when the apparatus is in operation, to provide an indication of a fault.

2. Apparatus in accordance with claim 1, in which the output means comprises first and second load resistors connected respectively to the first and second wiping connectors on the output side of the said connectors, and means responsive to a signal level difference across the load resistors due to current flow through one or other of the wiping connectors for generating the output signal.

3. Apparatus in accordance with claim 2, further comprising a differential amplifier having first and second control electrodes connected respectively to the first and second load resistors, one element of the amplifier including in its current path an output resistor across which the output signal is developed.

4. Apparatus in accordance with claim 1, in which the fault-indicating means comprises, connected to each wiping connector on the output side thereof, a common load resistor and means responsive to the absence of current in the common load resistor to provide the fault indication.

5. Apparatus in accordance with claim 4, in which the means responsive to the absence of current flow through the common load resistor comprises a differential amplifier having first and second control electrodes which are connected respectively to opposite ends of the common load resistor, one element of the amplifier having in its current path a further load resistor and the apparatus further comprising a switching element responsive to the absence of current flow through the said further load resistor.

6. Apparatus in accordance with claim 1, in which the means responsive to the input signal comprises a differential amplifier, one element of which is coupled to the input signal through a diode which is back biased or forward biased according to the logic level of the input signal, whereby one or other of the elements of the amplifier conducts according to the said logic level, two output electrodes of the amplifier being connected respectively to the first and second wiping connectors.

7. Apparatus in accordance with claim 1, in which the wiping electrical connectors comprise slip rings.

* * * * *